United States Patent
Tyan (10) Patent No.: US 10,330,168 B2
(45) Date of Patent: Jun. 25, 2019

(54) BI-RECTANGULAR VEHICLE BEAM WITH CELLULAR STRUCTURE

(71) Applicant: Ford Global Technologies, LLC, Dearborn, MI (US)

(72) Inventor: Tau Tyan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/592,585

(22) Filed: May 11, 2017

(65) Prior Publication Data
US 2018/0328435 A1    Nov. 15, 2018

(51) Int. Cl.
| F16F 7/12 | (2006.01) |
| B62D 21/02 | (2006.01) |
| B62D 25/00 | (2006.01) |
| B60R 19/34 | (2006.01) |
| B62D 21/15 | (2006.01) |

(52) U.S. Cl.
CPC ............ *F16F 7/121* (2013.01); *B60R 19/34* (2013.01); *B62D 21/02* (2013.01); *B62D 21/15* (2013.01); *B62D 25/00* (2013.01)

(58) Field of Classification Search
CPC .......... F16F 7/121; B60R 19/34; B62D 21/02; B62D 21/15
USPC .................................................. 296/187.09
See application file for complete search history.

(56) References Cited

U.S. PATENT DOCUMENTS

| 6,068,330 | A | * | 5/2000 | Kasuga | .................. B62D 21/15 188/377 |
| 7,614,658 | B2 | * | 11/2009 | Yamada | ............... B62D 21/152 280/784 |
| 8,353,545 | B1 | * | 1/2013 | Baldwin | .................. B60R 19/34 188/374 |
| 8,474,583 | B2 | | 7/2013 | Nagwanshi et al. | |
| 9,073,582 | B2 | | 7/2015 | Tyan et al. | |
| 9,187,127 | B2 | * | 11/2015 | Tyan | ..................... B62D 21/152 |
| 9,242,612 | B2 | | 1/2016 | Kawamata et al. | |
| 10,065,682 | B1 | * | 9/2018 | Tyan | ..................... B62D 21/15 |
| 10,081,391 | B1 | * | 9/2018 | Tyan | ..................... B62D 21/15 |
| 2011/0015902 | A1 | * | 1/2011 | Cheng | .................. B62D 21/152 703/1 |
| 2013/0140850 | A1 | * | 6/2013 | Tyan | ..................... B21D 35/006 296/187.03 |
| 2014/0292007 | A1 | * | 10/2014 | Kawamata | ............. B60R 19/34 293/133 |
| 2014/0346790 | A1 | * | 11/2014 | Kale | ....................... B60R 19/18 293/133 |
| 2017/0203790 | A1 | * | 7/2017 | Tyan | ..................... B60R 19/26 |
| 2017/0274933 | A1 | * | 9/2017 | Tyan | ..................... B60R 19/34 |
| 2018/0065667 | A1 | * | 3/2018 | Maier | .................... B62D 21/02 |
| 2018/0290611 | A1 | * | 10/2018 | Munjurulimana | ...... B60R 19/34 |
| 2018/0319441 | A1 | * | 11/2018 | Tyan | ..................... B62D 21/15 |

* cited by examiner

*Primary Examiner* — Jason S Morrow
(74) *Attorney, Agent, or Firm* — Vichit Chea; Brooks Kushman, P.C.

(57) ABSTRACT

A vehicle beam is provided. The vehicle beam may include an outer tube having four outer walls an inner tube having four inner walls inside the outer tube and a first set and a second set of ribs. The first set of ribs may extend from a midpoint of each inner wall to a midpoint of each outer wall. The second set of ribs may extend from a midpoint of each of the first set of ribs to one corner of the outer tube.

20 Claims, 8 Drawing Sheets

*Fig-6* ns shown have

BI-RECTANGULAR VEHICLE BEAM WITH CELLULAR STRUCTURE

TECHNICAL FIELD

This disclosure relates to beams in vehicles that provide improved reaction forces against bending loads and crush loads.

BACKGROUND

Vehicle frames may include a variety of beams that make up structure of the vehicle. Cross beams may extend between longitudinal frame rails to provide sufficient resistance to side impacts. Pillars are beams that support the vehicle roof and resist crush loads. Bumper support beams extend between a vehicle frame and front or rear bumpers to absorb energy associated with front or rear impacts. More stringent fuel and emissions standards have created the need to reduce the weight of vehicles. However, vehicle safety standards and ratings require strengthening of beams to increase absorption of energy and improve crash performance. Stronger lighter-weight materials have been incorporated in vehicles by primarily changing the materials of the beams. But changing to lightweight materials may not be sufficient to minimize weight and improve crash worthiness.

The present disclosure is directed to achieving fuel economy driven weight reduction in vehicle beams and structural members while maximizing bending strength and energy absorption during a crash.

SUMMARY

According to one aspect of this disclosure a vehicle beam is provided. The vehicle beam may include an outer tube having four outer walls an inner tube having four inner walls inside the outer tube and a first set and a second set of ribs. The first set of ribs may extend from a midpoint of each inner wall to a midpoint of each outer wall. The second set of ribs may extend from a midpoint of each of the first set of ribs to one corner of the outer tube.

According to another aspect of this disclosure a bumper support beam for a vehicle is provided. The bumper support beam may include four outer walls forming an outer rectangular tube and four inner walls forming an inner rectangular tube. The bumper support beam may also include a plurality of corner ribs and a plurality of inner ribs. The plurality of corner ribs may be disposed between the inner and outer periphery and are arranged to define a plurality of trapezoidal cells. The plurality of inner ribs may intersect at a center of each trapezoidal cell and define plural triangular cells.

According to yet another aspect of this disclosure a vehicle structural member is provided. The structural member may include four outer walls forming an outer rectangular tube and four inner walls forming an inner rectangular tube. The structural member may also include a first set and second set of corner ribs. The first set of corner ribs may extend from the outer rectangular tube and the second set of corner ribs may extend from the inner rectangular tube. The first and second set of ribs may converge to define plural triangular cells.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
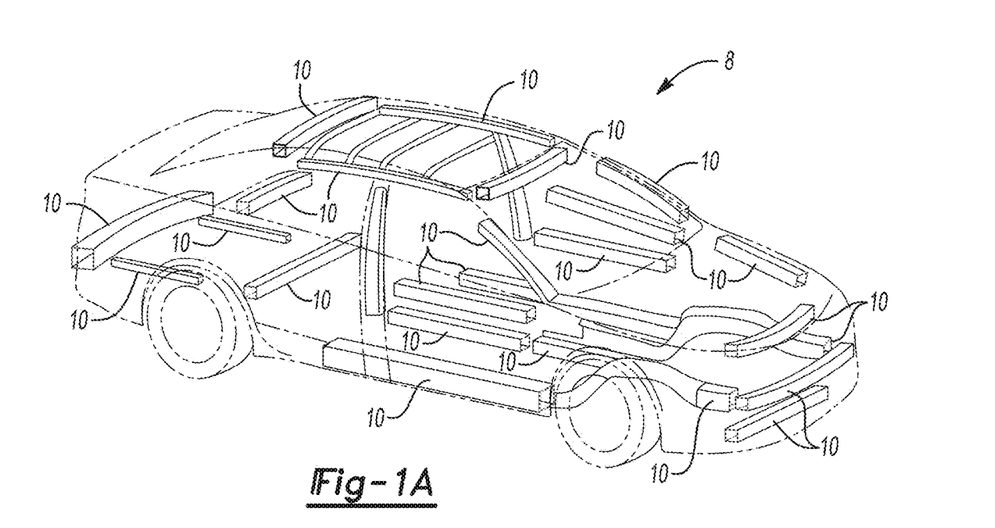
FIGS. 1A-1B is a perspective view of a vehicle according to one embodiment of this disclosure.
Figure 1B:
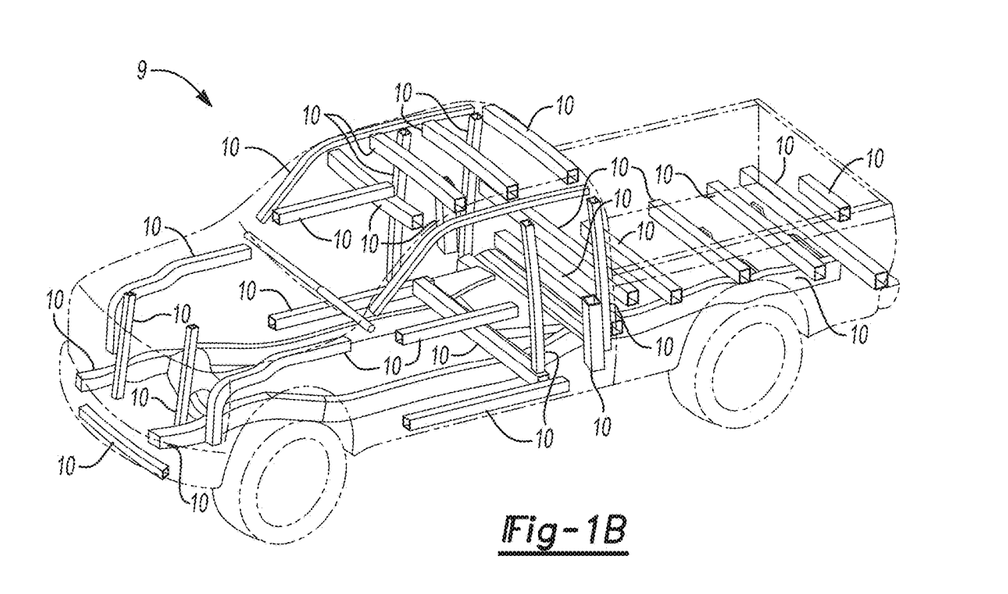

Referring to FIG. 1A, a perspective view of a vehicle frame 8, particularly a sedan, is illustrated. The vehicle frame 8 includes multiple bi-rectangular cellular beams 10 according to at least one embodiment of this disclosure. FIG. 1B is a perspective view of a vehicle frame 9, particularly a truck, including multiple bi-rectangular cellular beams 10 according to at least one embodiment of this disclosure. Within each vehicle frame 8, 9, the bi-rectangular cellular beams 10 may be implemented in various components, including but not limited to, a crush can, a front rail, a front side rail, a rear side rail, a rear rail, a frame cross member, a shotgun, a hinge-pillar, an A-pillar, B pillar, C-pillar, a door beam, a cross car beam, a front header, a rear header, c cow top, a roof rail, a lateral roof bow, a longitudinal roof bow, a body cross member, a back panel cross member, a rocker, an underbody cross member, a beltline, and an IP cross-car beam.

Although the multiple bi-rectangular cellular beams 10 are shown implemented within a vehicle frame, the beams may also be implemented in other applications, including but not limited to, aircraft, space craft, marine vehicles or other primary movers requiring a high energy absorbing and lightweight structure.

Figure 2A:
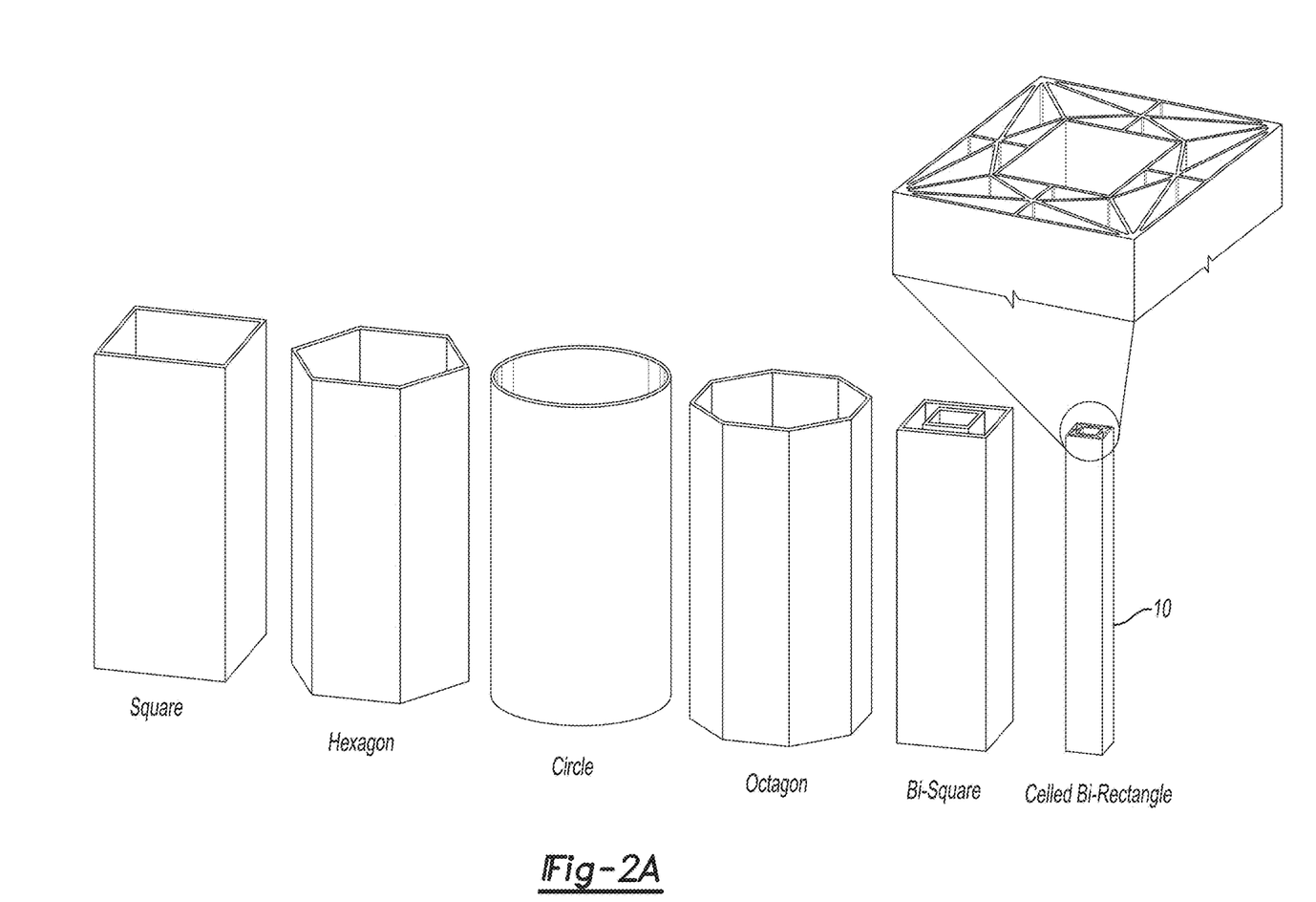
FIGS. 2A-2B is a perspective view of structural walls of varying cross sections with the same mass and an exemplary axial collapse of the same.
Figure 2B:
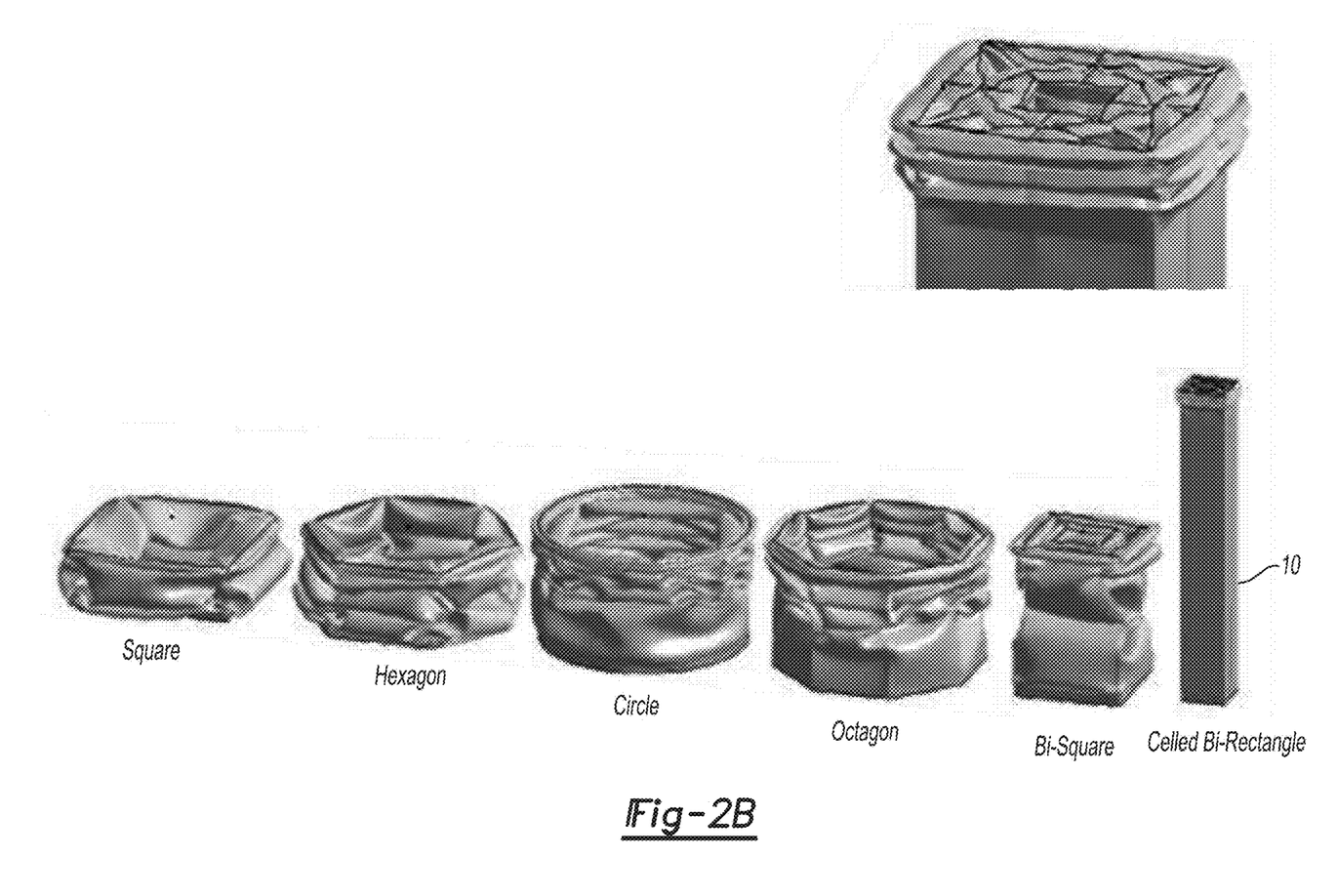

Referring to FIGS. 2A-2B, a perspective view of structural members of varying cross sections and an exemplary axial collapse of the same is illustrated. More specifically the figure shows a comparison of the crash energy absorption of strengthening members, e.g. square, hexagon, circle, octagon, bi-square, and the bi-rectangular cellular beam 10 for an impact with a rigid wall at 35 mph. The bi-rectangular cellular beam 10 demonstrated the shortest crush distance and smallest folding length. Moreover, the bi-rectangular cellular beam 10 also demonstrated the most stable axial collapse and the highest energy absorption. In fact, the bi-rectangular cellular beam 10 can achieve approximately 300-550% increase in crash energy absorption over a square cross section and a 100-400% increase in average crush force or crash energy absorption over octagon and circle cross sections. Each of the structural members shown have identical material, material thickness, perimeter, height, mass, impactor mass, impact speed and boundary conditions.

Figure 3:
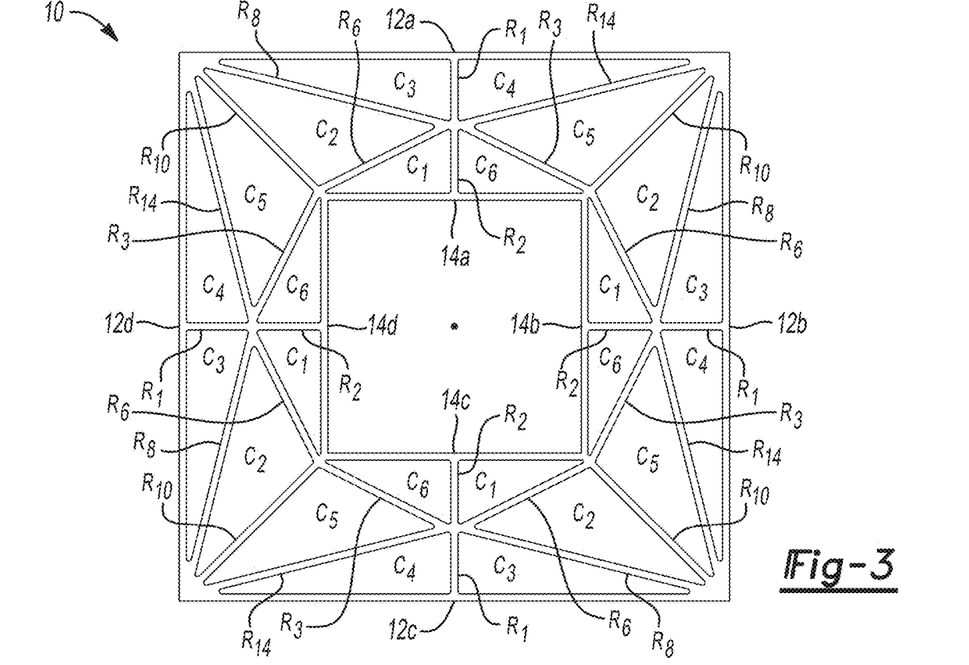
FIG. 3 is a top view of a structural beam according to one embodiment of this disclosure.

Referring to FIG. 3, a bi-rectangular cellular beam 10 according to one embodiment of this disclosure, is illustrated. The bi-rectangular cellular beam 10 includes four outer walls 12a-12d that connect at four corners and four inner walls 14a-14d that are connected by four corners. The outer and inner walls or sides 12a-12d and 14a-14d respectively, may have various lengths and thickness to meet strength and weight requirements. In one or more embodiments, inner walls 14a and 14c may be longer than the inner walls 14b and 14d, and vice versa. The outer walls 12a and 12c may be longer than the outer walls 12b and 12d and vice versa The inner wall and adjacent outer wall, e.g., 14d and 12d may be substantially parallel with one another (within 10° degrees of one another).

Ribs $R_1$-$R_{14}$ are disposed between the inner walls 14a-14d and the outer walls 12a-12d of the bi-rectangular cellular beam 10. The ribs $R_1$-$R_{14}$ may also be referred to as segments, webs, walls, web links, interstitial web links. The ribs or segments $R_1$-$R_{14}$ may vary in thickness to alter the compressive strength of the beam. In addition to the thickness, the length and orientation of the ribs are tunable parameters that allow the beam to be fine-tuned to control crush strength and bending resistance. These parameters may also be tuned to create preferred crush and bending modes for structures that are not uniform or not straight.

Ribs $R_1$ and $R_2$ extend between a midpoint of the outer wall 12b to a midpoint of the inner wall 14b. While two ribs $R_1$ and $R_2$ are shown extending between the inner and outer walls, only one rib, either $R_1$ or $R_2$, may extend between the inner and outer wall 14b and 12b instead of two. Ribs $R_3$ and $R_6$ extend from the corners defined by the inner walls 14a, 14b and 14c to ribs $R_1$ and/or $R_2$. Ribs $R_8$ and $R_{14}$ extend from the outer corners defined by the outer walls 12a, 12b, and 12c to ribs $R_1$ and/or $R_2$. $R_{10}$ may extend between the outer corners defined by the outer walls 12b, 12a, and 12c to inner corners defined by the inner walls 14a, 14b, and 14c.

The ribs $R_1$-$R_{14}$, the inner walls 14a-14d, and the outer walls 12a-12d are arranged to form a number of triangular cells $C_1$-$C_6$. $C_1$ and $C_6$ may be right-angle triangles that are adjacent to the inner wall 14b. A triangular cell may include cells $C_2$ and $C_5$ are defined by ribs $R_8$, and $R_{14}$, that extend from an outer corner of the outer walls 12a-12d, and ribs $R_3$ and $R_6$ connect ribs $R_8$ and $R_{14}$. Cells $C_2$ and $C_5$ are bifurcated by rib $R_{10}$. Cells $C_3$ and $C_4$ are defined by ribs $R_8$, and $R_{14}$, the outer wall 12b and are bifurcated by rib $R_1$. An isosceles trapezoidal cell is formed by the inner wall 14b, Ribs $R_{10}$, and the outer wall 12b. These cells and the configuration of ribs, weblinks, or segments is repeated radially around the bi-rectangular cellular beam 10.

While the ribs or segments are shown, and described above as being repeated radially around the bi-rectangular cellular beam 10, some ribs and segments may be removed all together. For instance, ribs $R_1$ and $R_2$ between the outer wall 12a and inner wall 14a may be removed to decrease the stiffness of the bi-rectangular cellular beam 10 loaded axially while maintaining the stiffness of the bi-rectangular cellular beam 10 under transverse loads. Contrastingly, ribs $R_1$ and $R_2$ between the outer wall 12b and inner wall 14b may be removed to decrease the stiffness of the bi-rectangular beam under transverse loads, while maintaining the compressive strength of the beam in compressive loading.

The beam or structural member 10 may have a fixed cross-sectional profile formed by an extrusion process. The extrusion process may generally include heating a stock material, loading it into a container within a press and pressing the material to push it out of the die. Furthermore, the side lengths and configurations, and/or degrees of the internal and external angles, of the present teachings can achieve a similar, if not greater, strength increase as thickened corners, while minimizing mass per unit length of the member and maintaining a high manufacturing feasibility because the member can be formed by stamping, press forming, hydro-forming, molding, die casting, 3-D printing, and extrusion. The beam or structural member 10 may be made of various materials, including but not limited to aluminum alloys, magnesium alloys, polymers, and ceramics.

Figure 4:
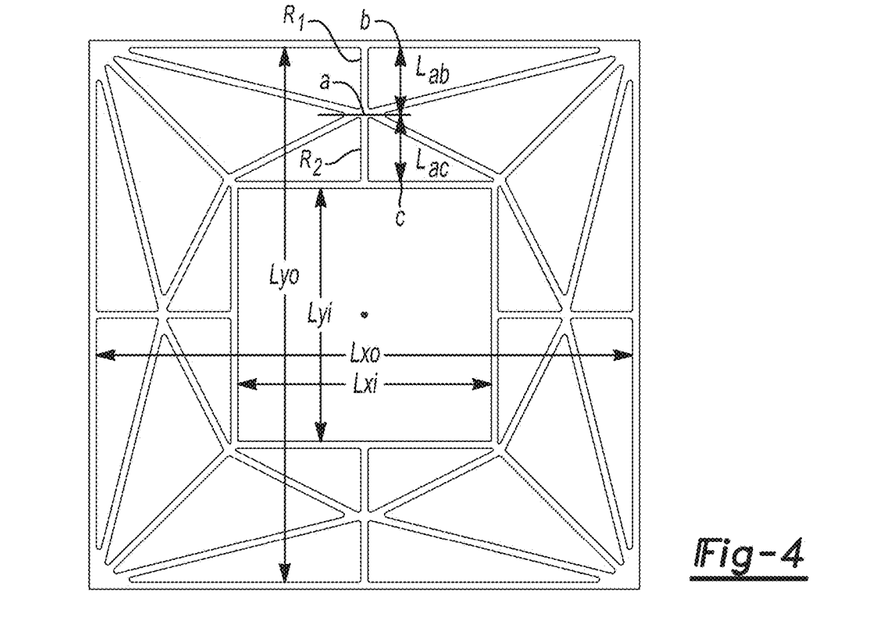
FIG. 4 is a top view of an example structural beam according to one embodiment of this disclosure.
Figure 5A:
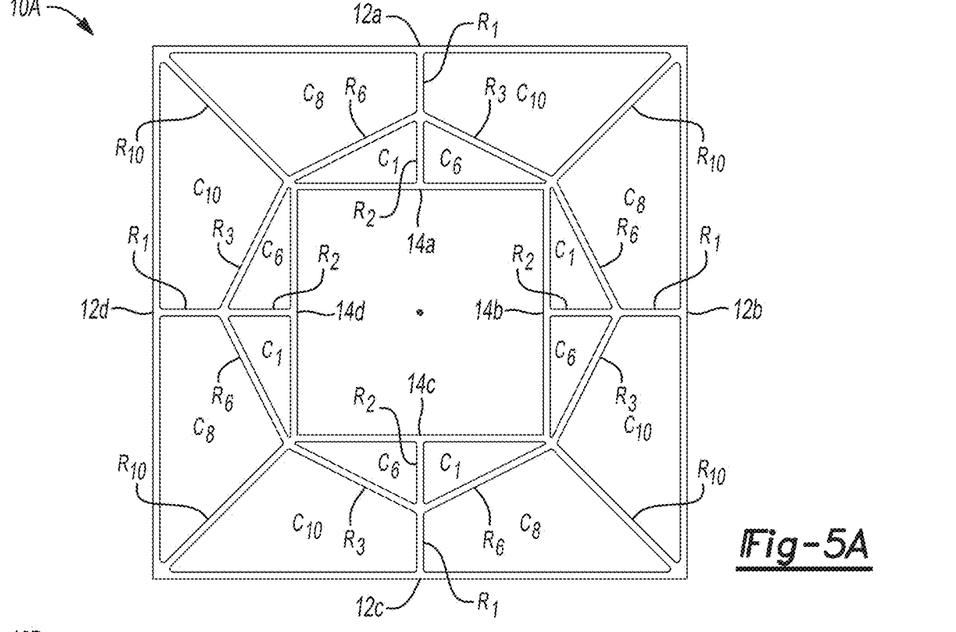
FIGS. 5A-5G is a top view of structural beams according to one or more embodiments of this disclosure.
Figure 5B:
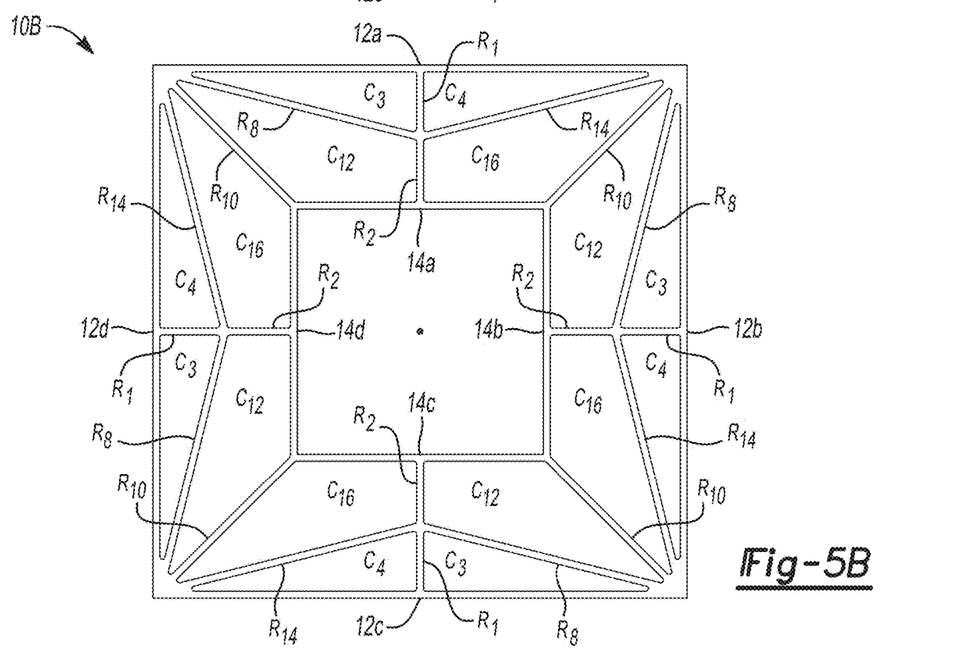
Figure 5C:
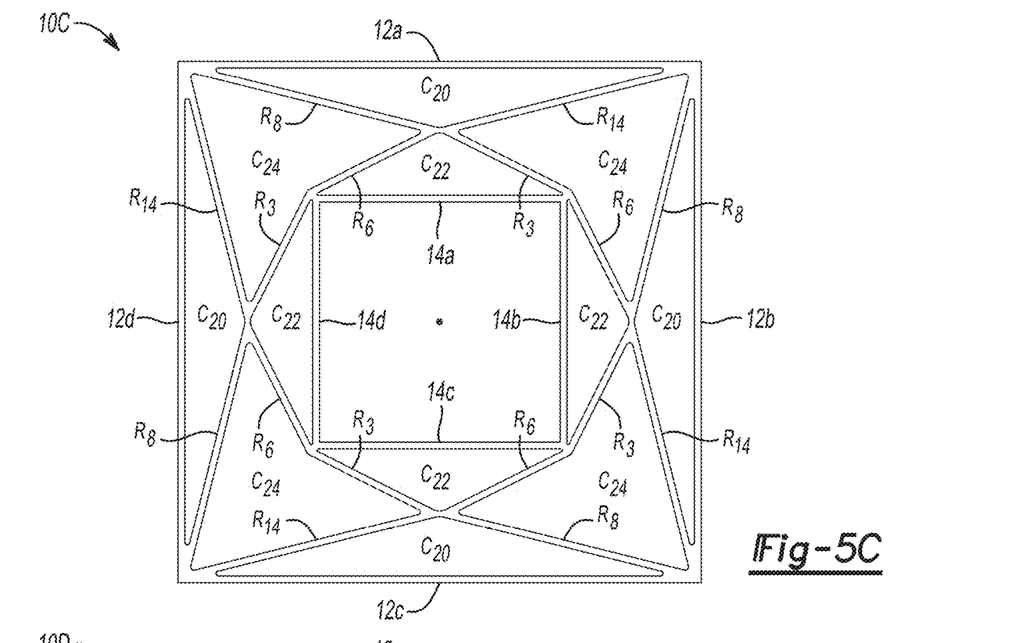
Figure 5D:
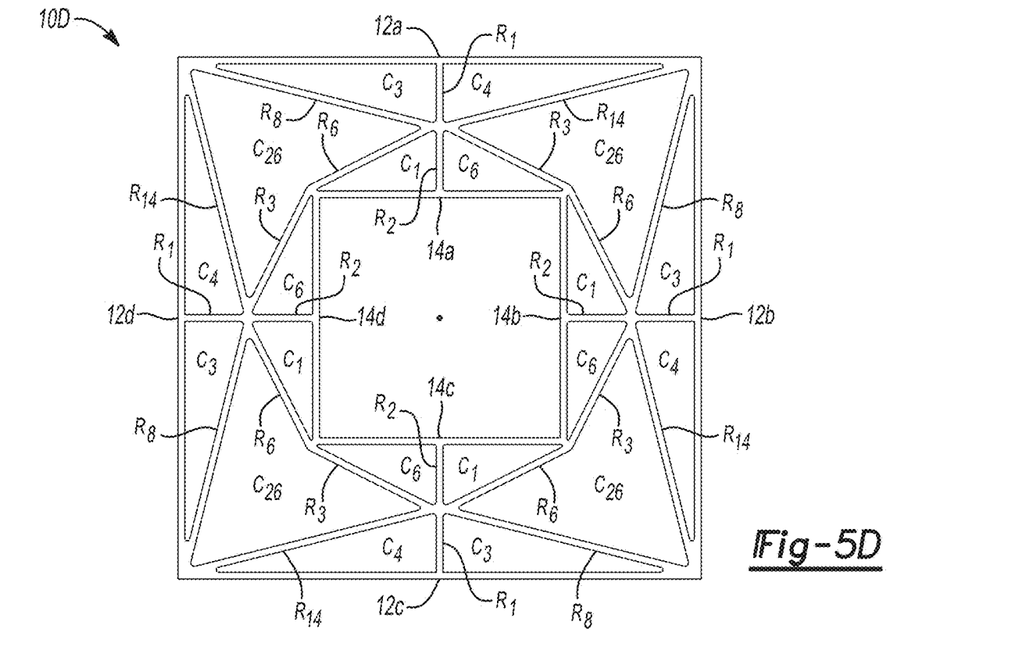
Figure 5E:
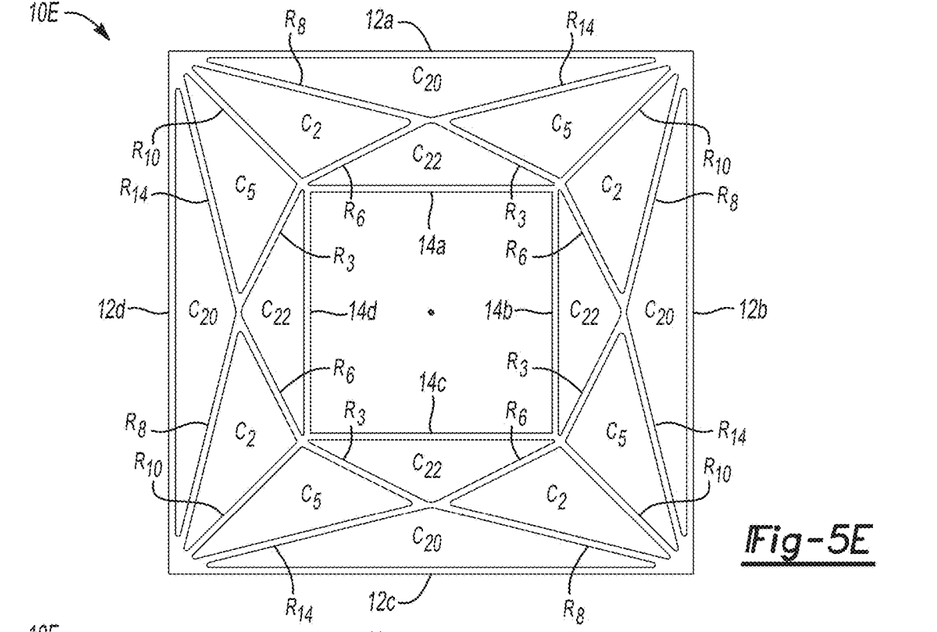
Figure 5F:
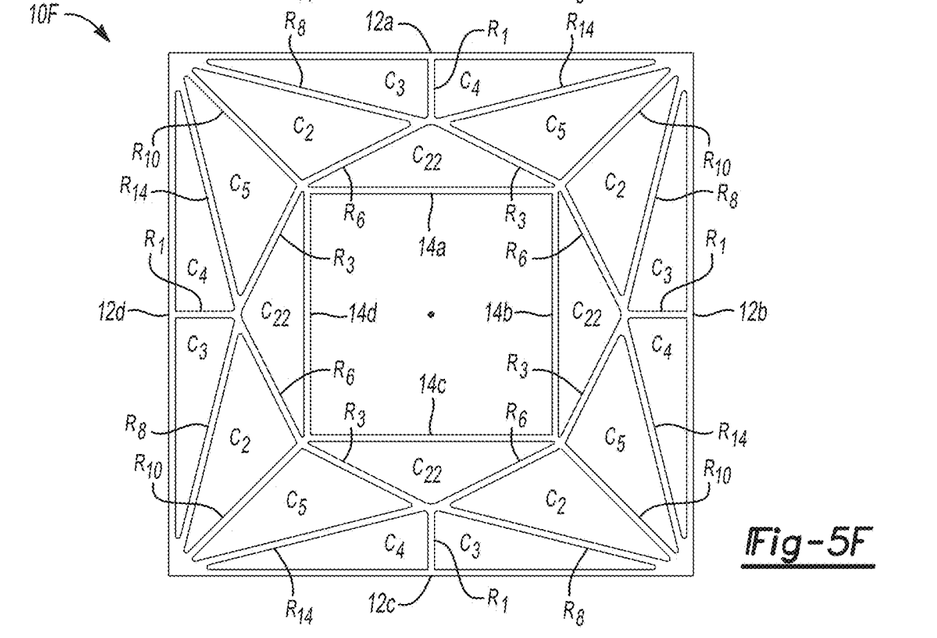
Figure 5G:
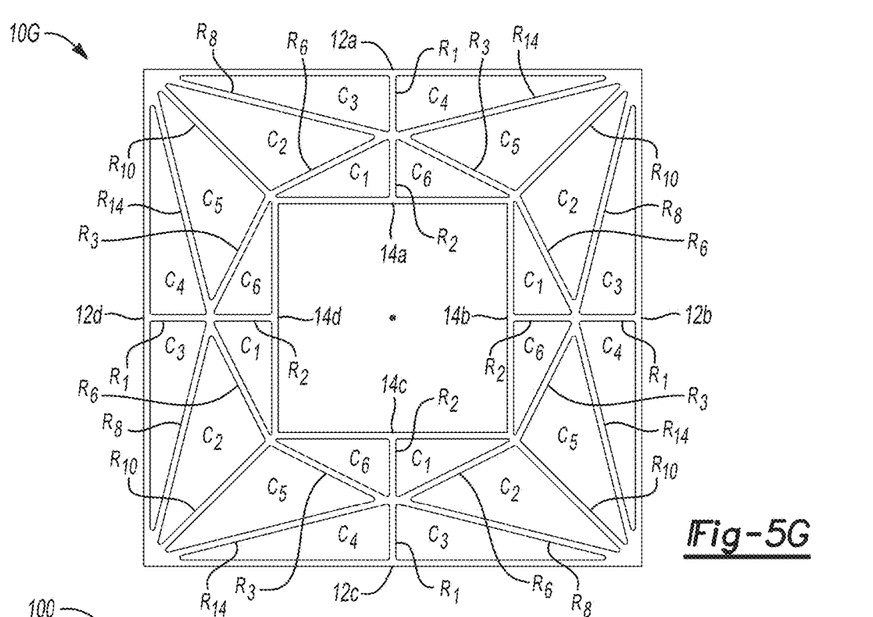

Referring to FIG. 4, the dimensions of the ribs or interstitial weblinks and the height and widths of the inner and outer rectangular tubes are shown. Rib $R_1$ extends between point a and point b and may have a length Lab. Rib $R_2$ may extend between a mid point of one of the inner walls, labeled "c" to point a connecting end of rib $R_1$, labeled "a." Rib $R_2$ may have a length Lac. Lengths of Lab and Lac may have a ratio between $$4.0 > \frac{Lab}{Lac} > 0.25.$$

The outer rectangular tube or walls may have a height $L_{yo}$ and a width $L_{xo}$. The inner rectangular tube or walls may have a height $L_{yi}$ and a width $L_{xi}$. The widths of the inner and outer tubes may have a ratio such as $$10 > \frac{Lxo}{Lxi} > 1.25.$$

Similarly, the heights of the inner and outer tubes may have a ratio such as $$10 > \frac{Lyo}{Lyi} > 1.25.$$

The height and width of the outer tube may have an aspect ratio between $$4 > \frac{Lxo}{Lyo} > 0.25.$$

The height and width of the inner tube may have an aspect ratio between $$4 > \frac{Lxi}{Lyi} > 0.25.$$

Referring to FIGS. 5A-5G, a top view of various bi-rectangular cellular beam 10 according to one or more embodiments of this disclosure, is illustrated. Each beam 10A-10G includes four outer walls 12a-12d that are connected by four corners. The four sides or walls 12a-12d may have various lengths and thickness to meet strength and weight requirements. The inner walls 14a-14d of the inner periphery are substantially parallel to the outer walls 12a-

12d. The beams 10A-10G may have more or less ribs depending on the required strength of the beam. Depending on the required strength, the number of ribs may be increased or decreased. Altering the number of ribs allows various beams having the same outer perimeter or diameter for various structural components of the vehicle. Fewer ribs provides for a lighter weight beam and an increased crush distance or deflection under loads. More ribs make the beam heavier and decrease the amount of crush distance or deflection under load.

The bi-rectangular cellular beam 10A (FIG. 5A) includes five different ribs arranged in a pattern that is repeated radially around the beam. Ribs $R_1$ and $R_2$ extend between a midpoint of the outer wall 12b to a midpoint of the inner wall 14b. While two ribs $R_1$ and $R_2$ are shown extending between the inner and outer walls, only one rib, either $R_1$ or $R_2$, may extend between the inner and outer wall 14b and 12b instead of two. Ribs $R_3$ and $R_6$ extend from the corners defined by the inner walls 14a, 14b and 14c to ribs $R_1$ and/or $R_2$. The ribs the inner walls 14a-14d, and the outer walls 12a-12d are arranged to form triangular cells $C_1$ and $C_6$ and polygonal cells $C_8$ and $C_{10}$. Cells $C_1$ and $C_6$ may be right-angle triangles that are adjacent to the inner wall 14b. Polygonal cells $C_8$ and $C_{10}$ are defined by ribs $R_3$, $R_6$, $R_{10}$, and outer walls 12a-12d.

The bi-rectangular cellular beam 10B (FIG. 5B) includes five different ribs arranged in a pattern that is repeated radially around the beam. Ribs $R_1$ and $R_2$ extend between a midpoint of the outer wall 12b to a midpoint of the inner wall 14b. While two ribs $R_1$ and $R_2$ are shown extending between the inner and outer walls, only one rib, either $R_1$ or $R_2$, may extend between the inner and outer wall 14b and 12b instead of two. Ribs $R_8$ and $R_{14}$ extend from the outer corners defined by the outer walls 12a, 12b, and 12c to ribs $R_1$ and/or $R_2$. $R_{10}$ may extend between the outer corners defined by the outer walls 12b. Polygonal cells $C_{12}$ and $C_{16}$ are defined by the inner wall 14b and ribs $R_8$ and $R_{14}$. Cells $C_3$ and $C_4$ are defined by the outer wall 12b and the ribs $R_8$ and $R_{14}$.

The bi-rectangular cellular beam 10C (FIG. 5C) includes four different ribs in a pattern that is repeated radially around the beam. Ribs $R_3$ and $R_6$ extend from the corners defined by the inner walls 14a, 14b and 14c to ribs $R_8$ and $R_{14}$, that extend from the corners defined by the outer walls 12a, 12b, and 12c. Triangular cells $C_{22}$ and $C_{20}$ are defined by ribs $R_3$ and $R_6$ and ribs $R_8$ and $R_{14}$. Cells $C_{24}$ are defined by ribs $R_8$ and $R_{14}$ and ribs $R_3$ and $R_6$.

The bi-rectangular cellular beam 10D (FIG. 5D) includes six different ribs in a pattern that is repeated radially around the beam. Ribs $R_3$ and $R_6$ extend from the corners defined by the inner walls 14a, 14b and 14c to ribs $R_8$ and $R_{14}$, that extend from the corners defined by the outer walls 12a, 12b, and 12c. Triangular cells $C_1$, $C_3$, $C_4$, and $C_6$ are defined by ribs $R_3$ and $R_6$ and ribs $R_8$ and $R_{14}$. Cell $C_{26}$ is defined by ribs $R_8$ and $R_{14}$ and ribs $R_3$ and $R_6$. Ribs $R_1$ and $R_2$ extend between a midpoint of the outer wall 12b to a midpoint of the inner wall 14b. While two ribs $R_1$ and $R_2$ are shown extending between the inner and outer walls, only one rib, either $R_1$ or $R_2$, may extend between the inner and outer wall 14b and 12b instead of two.

The bi-rectangular cellular beam 10E (FIG. 5E) includes six different ribs in a pattern that is repeated radially around the beam. Ribs $R_3$ and $R_6$ extend from the corners defined by the inner walls 14a, 14b and 14c to ribs $R_8$ and $R_{14}$, that extend from the corners defined by the outer walls 12a, 12b, and 12c. Triangular cells $C_{22}$ and $C_{20}$ are defined by ribs $R_3$ and $R_6$ and ribs $R_8$ and $R_{14}$, respectively. Cells $C_2$ and $C_5$ are defined by ribs $R_8$, $R_{10}$, $R_{14}$ and ribs $R_3$ and $R_6$. Ribs $R_{10}$ extend from the outer corners defined by the outer walls 12a-12d to the inner walls 14a-14d.

The bi-rectangular cellular beam 10F (FIG. 5F) is nearly identical to the bi-rectangular cellular beam 10E, with the exception of rib $R_1$. Rib $R_1$ extends between a midpoint of the outer wall 12b to ribs $R_3$ and $R_6$. The bi-rectangular cellular beam 10G (FIG. 5G) is identical to the bi-rectangular cellular beam 10 illustrated in FIG. 3.

Those of ordinary skill in the art would understand, however, that FIGS. 5A-5G are exemplary only, and are provided merely to illustrate how design parameters can be utilized to modulate the cross section of the exemplary embodiment of FIG. 3. Thus, as above, the present teachings contemplate various bi-hexagonal cellular cross section configurations having various shapes and dimensions (i.e., corner bend radii, side lengths and/or thicknesses), which can be adjusted based on space requirements and/or to control member collapse modes.

In some exemplary embodiments, some or all of the cells of an exemplary cellular structure may be partially or wholly filled with various fillers. Further, more than one cellular structure may be provided, and with some or all of one or more of the cellular structures having some or all of the cells of the given structure being partially or wholly filled with one or more types of fillers. For example, where temperature control is desired, some or all of the cells may be partially or wholly filled with thermally insulating filler(s). Exemplary thermally insulating fillers include various foams (e.g., blown fiber glass foam, polyurethane foams), mineral wool, cellulose, polystyrene aerogels, cork, and combinations thereof. Additionally or alternatively, in other various exemplary embodiments, where sound control is required, some or all of the cells of the exemplary cellular structure(s) may be partially or wholly filled with noise insulating filler(s). Exemplary noise insulating fillers include sponge(s) melamine acoustic foams, mineral wool, open-cell rubber foams, and combinations thereof. In further various exemplary embodiments, where further structural reinforcement is desired, the cells may be partially or wholly filled with strengthening filler(s). Exemplary strengthening fillers include structural foam(s), such as thermoplastic structural foams, aluminum foams, glass or carbon fiber-reinforced structural foams, closed-cell polymer foams, and combinations thereof. In some exemplary embodiments, more than one type of filler may be incorporated in the cells. In some other exemplary embodiments, a filler may provide more than one, or even all, of the thermally insulating, noise insulating, and strengthening functions and may partially or wholly fill some or all of the cells of the exemplary cellular structure(s). Alternatively, some or all of the cells may be left unfilled (i.e., hollow or empty).

Figure 6:
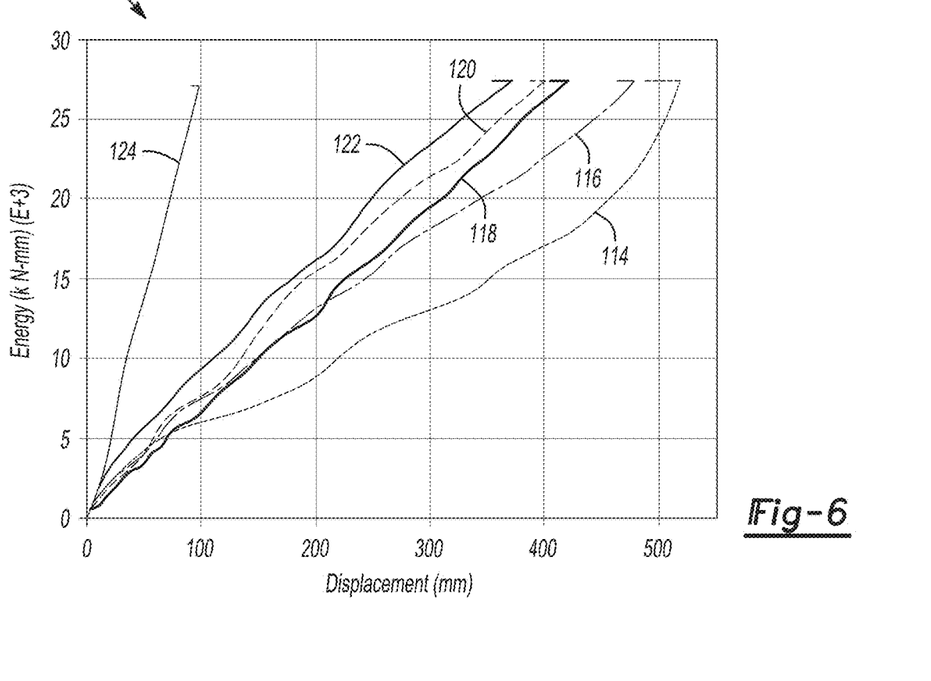
FIG. 6 is a graph comparing crush energy absorption for several beams having a cross section corresponding to FIGS. 2A-2B.

Referring to FIG. 6, a crush energy chart is identified by reference numeral 100. The crush energy chart provides a comparison of beams made in accordance with the embodiment of FIGS. 2A-2B. The beams tested were of identical material thickness, material thickness, perimeter, and height, but had different shapes. In the crush energy chart 100, line 114 illustrates the performance of a square beam indicating that the displacement in response to 27,500 kN·mm was approximately 520 mm. Line 116 illustrates the performance of a hexagonal beam which at 27,500 kN·mm was approximately 475 mm. Line 118 illustrates a circular beam in the test and indicates that at 27,500 kN·mm resulted in a displacement of approximately 415 mm. Line 120 illustrates the crush energy performance of an octagonal beam which at 27,500 kN·mm, the displacement was approximately 400 mm. Line 122 illustrates that in the same test a bi-square beam without a celled structure provided energy absorption of 27,500 kN·mm with a displacement of approximately 375 mm. Line 124 illustrates the performance of a tube made according to FIG. 3 and FIG. 4 provided energy absorption of 27,500 kN·mm with a displacement of approximately 100 mm.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle beam comprising:
    an outer tube having four outer walls an inner tube having four inner walls inside the outer tube;
    a first set of ribs extending from a midpoint of each inner wall to a midpoint of each outer wall; and
    a second set of ribs extending from a midpoint of each of the first set of ribs to one corner of the outer tube.

2. The vehicle beam of claim 1, wherein the first and second set of ribs and four walls of the outer tube defines a plurality of triangular cells.

3. The vehicle beam of claim 2, wherein the plurality of triangular cells are right-angle triangular cells.

4. The vehicle of claim 1, further comprising a third set of ribs wherein the third set of ribs, the inner tube, and the outer tube define at least one isosceles trapezoidal cells.

5. The vehicle beam of claim 4, wherein the third set of ribs extend from the corners of the inner tube to one of the corners of the outer tube.

6. The vehicle beam of claim 1, wherein the outer tube defines a width $L_{xo}$ and the inner tube defines a width $L_{yo}$, wherein a ratio of $L_{xo}$ and $L_{yo}$ may range from $$4 > \frac{Lxo}{Lyo} > 0.25.$$

7. The vehicle of claim 1, wherein the outer tube defines a height $L_{yo}$ and the inner tube defines a height $L_{yi}$ wherein a ratio of $L_{yo}$ and $L_{yi}$ may range from $$10.0 > \frac{Lyo}{Lyi} > 1.25.$$

8. The vehicle beam of claim 1, wherein the first set of ribs includes a first rib having a length $L_{ab}$ and a second rib having a length $L_{ac}$ wherein a ratio of $L_{ab}$ and $L_{ac}$ may range from $$4.0 > \frac{Lab}{Lac} > 0.25.$$

9. A bumper support beam for a vehicle comprising:
    four outer walls forming an outer rectangular tube;
    four inner walls forming an inner rectangular tube;
    a plurality of corner ribs disposed between the inner and outer periphery wherein the ribs are arranged to define a plurality of trapezoidal cells; and
    a plurality of inner ribs intersecting at a center of each trapezoidal cells and defining plural triangular cells.

10. The bumper support beam of claim 9, wherein the rectangular outer tube defines a height Lyo and the rectangular inner tube defines a height Lyi wherein a ratio of Lyo and Lyi may range from $$10 > \frac{Lyo}{Lyi} > 1.25.$$

11. The bumper support beam of claim 9, wherein the rectangular outer tube defines a width Lxo and rectangular inner tube defines a width Lxi wherein a ratio of Lxo and Lyi may range from $$4 > \frac{Lxi}{Lyi} > 0.25.$$

12. The bumper support beam of claim 9, further comprising a first set of interstitial weblinks, wherein the first set of interstitial weblinks extend between a midpoint of the four walls of the inner rectangular tube to a midpoint of the four walls of the outer rectangular tube.

13. The bumper support beam of claim 12, wherein the four walls of the inner rectangular tube, the plurality of inner ribs, and the first set of interstitial weblinks define plural right angle triangular cells.

14. The bumper support beam of claim 13, wherein the first set of interstitial weblinks includes a first weblink having a length $L_{ab}$ and a second weblink having a length $L_{ab}$ wherein a ratio of $L_{ab}$ and $L_{ac}$ may range from $$4.0 > \frac{Lab}{Lac} > 0.25.$$

15. The bumper support beam of claim 12, further comprising a second set of interstitial weblinks wherein the second set of interstitial weblinks extend from a midpoint of each of the first set of interstitial weblinks to each corner of the outer periphery.

16. The bumper support beam of claim 15, wherein the second set of interstitial weblinks and outer rectangular tube defines plural right angle triangular cells.

17. A vehicle structural member comprising:
    four outer walls forming an outer rectangular tube;
    four inner walls forming an inner rectangular tube;
    a first set of corner ribs extending from the outer rectangular tube; and
    a second set of corner ribs extending from the inner rectangular tube wherein the first and second set of corner ribs converge to define plural triangular cells.

18. The structural member of claim 17, further comprising a first set of interstitial weblinks extending from a midpoint of the outer rectangular tube and terminating at an intersection of the first and second set of corner ribs.

19. The structural member of claim 18, further comprising a second set of interstitial weblinks extending from a midpoint of the inner rectangular tube and terminating at an intersection of the first and second set of corner ribs.

20. The structural member of claim 19, further comprising a third set of interstitial weblinks extending from the corner of the outer rectangular tube to the corner of the inner rectangular tube.

* * * * *